C. M. KEMP.
CARBURETER.
APPLICATION FILED AUG. 19, 1910.
989,848.
Patented Apr. 18, 1911.
3 SHEETS—SHEET 1.
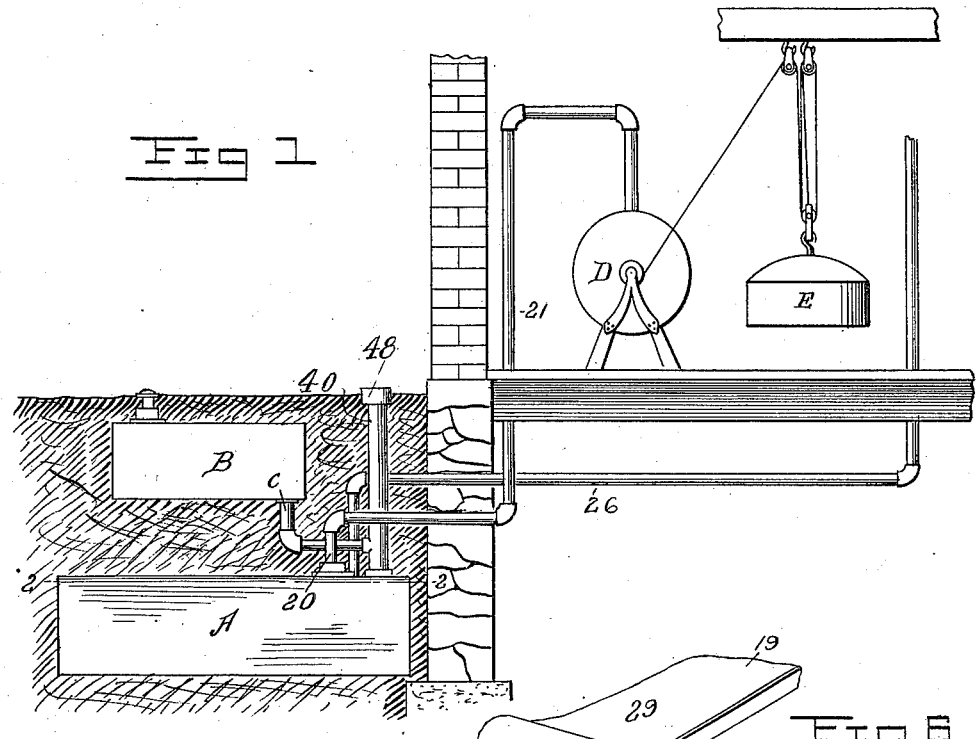
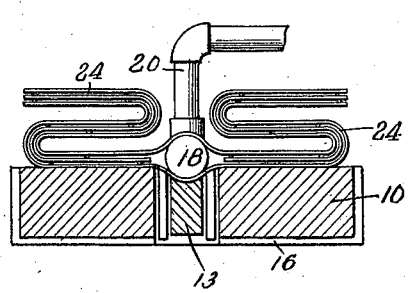
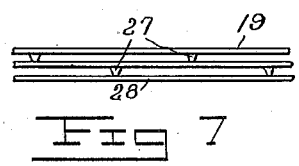
Inventor
Clarence M. Kemp
Witnesses

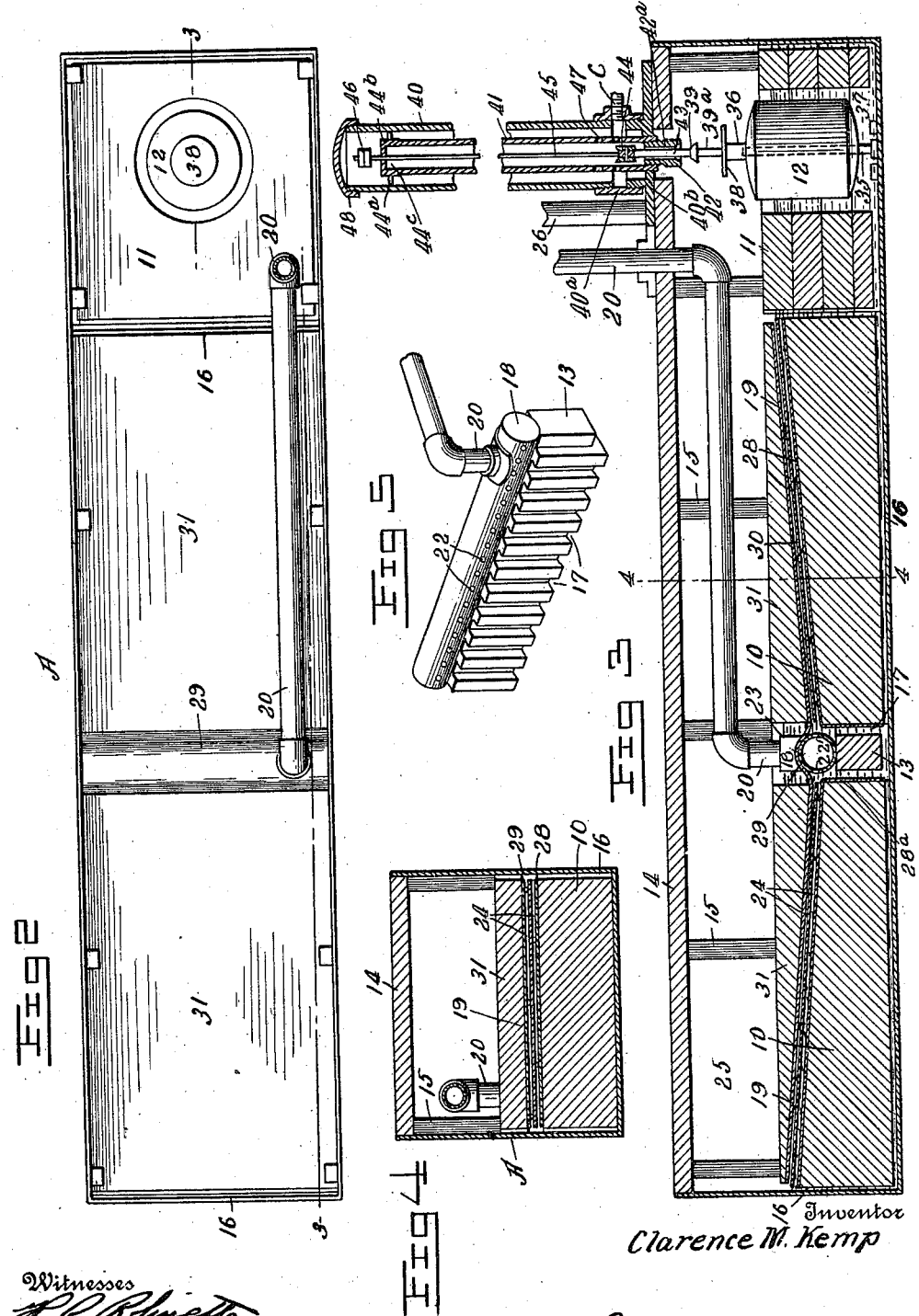

C. M. KEMP.
CARBURETER.
APPLICATION FILED AUG. 19, 1910.
989,848.
Patented Apr. 18, 1911.
3 SHEETS—SHEET 3.
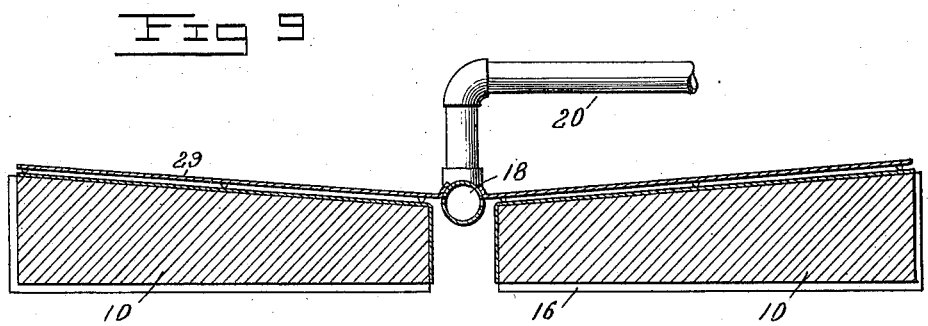
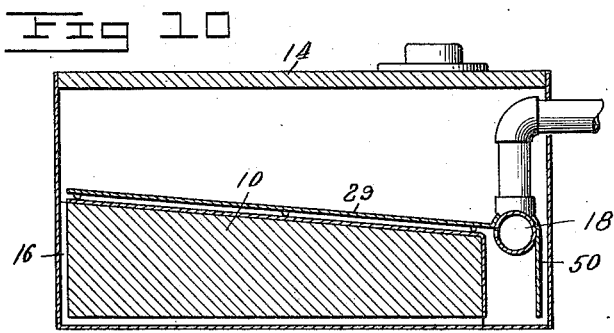
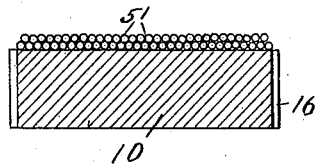
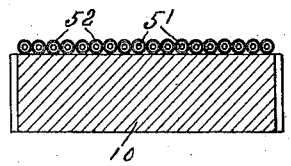
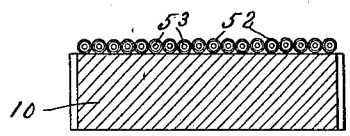
Inventor
Clarence M. Kemp
Witnesses
By
Attorney

UNITED STATES PATENT OFFICE.

CLARENCE M. KEMP, OF BALTIMORE, MARYLAND, ASSIGNOR TO THE C. M. KEMP MANUFACTURING COMPANY, OF BALTIMORE, MARYLAND, A CORPORATION OF MARYLAND.

CARBURETER.

989,848.  Specification of Letters Patent.  Patented Apr. 18, 1911.

Application filed August 19, 1910. Serial No. 577,962.

*To all whom it may concern:*

Be it known that I, CLARENCE M. KEMP, a citizen of the United States, residing at Baltimore, in the State of Maryland, have invented new and useful Improvements in Carbureters, of which the following is a specification.

This invention relates to an apparatus for carbureting air; more particularly to that class of machines in which a constant level of hydrocarbon fluid is maintained in the machine through and over which a current of air passes and takes up the volatile parts of said hydrocarbon forming a combustible gas suitable both for heating and illuminating purposes.

With this object in view the invention comprises a closed tank or carbureting vessel into which hydrocarbon, such as gasolene, enters through a valved pipe governed by a float for maintaining a constant level of gasolene in said tank. Within the tank is a spraying head, having very small perforations, connected to a pipe through which air is forced, and as the air emerges in fine streams from said head, it enters first, the body of gasolene, stirring up the same and then passing through very shallow channels with gasolene coated walls to a chamber and from thence out through the gas main to the point or points of service.

To more clearly disclose the structure and operation of this invention, attention is directed to the following detailed description and to the accompanying drawings, in which:—

Figure 1 is a side elevation of the carbureting machine partly in section with certain parts thereof shown diagrammatically;
Fig. 2, a horizontal sectional view on the line 2—2 of Fig. 1; Fig. 3 a vertical longitudinal sectional view on the line 3—3 of Fig. 2; Fig. 4 a transverse sectional view on the line 4—4 of Fig. 3; Fig. 5 a perspective view of a detail of the apparatus; Figs. 6 and 7, detail views of certain parts, Fig. 8, a view of a modification of the invention, Figs. 9 and 10 are longitudinal sectional views of other modifications of the carbureter; and Figs. 11, 12 and 13 are end views illustrating further modified types of one feature of the invention.

In the drawings in which similar reference characters are used to indicate the same parts, A indicates the carbureting tank which is preferably buried in the ground; B the gasolene reservoir, also buried; C the pipe connecting the reservoir B with the carbureting tank; D the pump for forcing air into said tank, and E a weight or other generator of power for operating the air pump.

Referring now to the detail construction of the carbureting tank A, 10, 10 indicate filler blocks or pieces which may be of wood or other suitable material and extend from end to end of the tank to lessen the capacity thereof, but are shown in this instance as spaced a suitable distance from one end to make room for another filler piece 11, made preferably of layers of wood, and having a vertical opening or well therethrough for a float 12, which plays vertically therein. The filler pieces 10 are of substantially equal length and slightly separated at their adjacent ends to receive a block 13 resting on the bottom of the tank A which latter is preferably made of plate metal having a wooden or other top 14 covered with sheet metal, supported by uprights 15 within the tank. Each filler piece 10 occupies about one half the height of the tank and its full width and rests on the bottom thereof. The bottom, sides and outer ends of the filler pieces are preferably grooved as shown at 16, to permit free passage of the gasolene around them. Grooves 17 are also made in the sides and bottom of the block 13 to permit the ready flow of gasolene around said block.
Resting upon or fastened to the top of the block 13 is a spraying head 18, here shown in the form of a cylinder, but may be of other shape, extending crosswise of the tank from side to side. To the spraying head 18 is connected one end of an air delivery pipe 20 which enters the tank through a suitable opening on the top 14; said pipe having connected thereto a pipe 21 leading from the air pump which when operated, forces air into the spraying head and thence through a row of minute holes 22 on each side of said head, diametrically placed, into gasolene contained in space 23 between the spraying head 18 and the inner ends of a carbureter supported upon the top surfaces of the filler pieces 10 which surfaces incline downwardly at a small angle from their outer to their inner ends and terminate just below the minute holes 22 in the spraying head.

Mounted on the inclined top of each filler piece 10 are the carbureting passages 19 formed with channels 24 through which the carbureted air passes to the gas chamber 25 in the top of the tank A and thence out through the main pipe 26 to be distributed. The channels 24 are as long and as wide as the filler pieces 10 and formed of two or more (three being shown in the drawings) parallel sheets or plates of thin metal, slightly separated from one another and held apart by spacing points 27, or other suitable means, as sheets of wire gauze see Fig. 7. The channels 24 are sealed or closed at their edges adjacent the sides of the tank by solder or other convenient or suitable material, or a strip 32, see Fig. 6. The lower plates 28 of the channels 24 rest on and cover the entire inclined tops of the filler pieces 10, the inner ends 28ª being folded over the inner ends of said filler pieces and extend nearly to the bottoms thereof between the filler pieces and the grooved sides of the block 13. The top plate 29 extends across both filler pieces 10 and is preferably curved at its center to fit over the spraying head 18. The intermediate plates 30 stop just short of the inner ends of the filler pieces 10. Above each channel 24 is a section of filler 31 of equal length and width as the fillers 10. Besides closing the sides of the channels 24 with solder, suitably shaped pieces 33 cover the ends of the spaces 23 on each side of the spraying head 18 as clearly shown in Fig. 6, and preferably soldered to the edges of the ends 28ª of the plates 28. If desired, the strips 32 and pieces 33 may be made integral.

As thus constructed, when air is forced from the head 18, through the minute holes 22 into the spaces 23, the pressure of the fine streams of air and its rapid movement agitates and churns with great intensity the gasolene contained in said spaces 23 and in the grooves 17 in the block 13. By thus forcing air, finely divided, through gasolene the normal level of which is about as high as the outlet ends of the channels 24 and, therefore, above the small holes 22, the volatile parts of the gasolene are absorbed by the air and, with some of the gasolene, are carried out through the exceedingly thin air spaces of the channels 24. As these channels are relatively long and wide with the walls close together, the surfaces of these walls become covered with a portion of the gasolene suspended in the carbureted air, while the remainder of said gasolene will be blown out through the open ends of the channels and pass down and under the filler pieces 10 to rise once more through the grooves 17 of the block 13 into the spaces 23 and be again acted upon by the air jets. The gasolene adhering to the walls of the channels 24 is spread over such an extensive area that it readily volatilizes and is absorbed by the comparatively slowly moving carbureted air, enriching the same to an unusual degree, even with gasolene of such a low degree of vaporization that it can not be used in carbureters of the usual type. By forcing the air in fine streams or spraying it into a body of gasolene and confining it in narrow channels as it passes to the gas chamber 25, the air cannot collect in bubbles, either large or small, and unequal carbureting is prevented.

It is to be noted that the evaporation of the gasolene tends to lower the temperature of that remaining in the tank which thus becomes less volatile, but such cooling is counteracted by burying the tank in the earth, the warmth of which is imparted to the metal sides and bottom of said tank and to the gasolene therein which is in contact with the aforesaid metal sides. It is to be further noted that as the filler pieces 10 lie close to the sides and bottom of the tank only a small quantity of gasolene is contained therein, and that quantity is distributed in a thin layer against the walls of the tank so that it will not be difficult to keep the gasolene at a suitable temperature.

The gasolene in the tank is maintained at a fixed height above the air outlet holes 22 by means of the float 12 which is permitted to rise and fall with the gasolene, and guided in its movement by means of a vertical pin 35 passing through a tube 36 in the float and secured to a cross-bar 37 or other suitable support fastened on the underside of the filler piece 11. The tube 36 extends above the float and is provided with a broad head or cap 38 which operates the gasolene inlet valve 39 above it.

Projecting upward from the top of the tank A in line with the axis of the float 12 is a vertical casing 40 extending up to the surface of the ground and being screwed into a coupling 40ª which is in turn screwed on a nipple 40ᵇ fastened to the top 14 of the tank. Within the casing 40 is a concentric tube 41 screwed into the nipple 40ᵇ and communicating with the tank A, through an annular plug 42 screwed in the bottom of the tube and having a valve seat on its under side for the gasolene inlet valve 39 which normally opens inwardly. The valve stem 43 is smaller than and slides freely in the opening 42ª formed in the plug 42 and has a cup shaped head 44 on its upper end. An extension 39ª is attached to the valve and projects downwardly in position to be engaged by the head 38 on the float tube 36 when the float rises to close the valve. The upper end of the tube 41 is provided with laterally projecting guide fingers 44ª to bear against the inside of the casing 40 and centralize the tube, and a polysided portion 44ᵇ on which a wrench may be fitted to insert and remove the tube 41. A rod 45 rests at its lower end in the cup-shaped head 44 of the valve stem 43 and extends upwardly within the tube 41 and through an opening in the upper end where it is arranged to carry weights 46 for depressing the float whereby the normal level of gasolene in the tank is regulated. Perforations 47 are made in the tube 41 for the entrance of gasolene thereinto from the casing 40 which latter receives the hydrocarbon through a pipe C from the tank B. The casing 40 and the tube 41 extend upward from the tank to the top of the ground, when the tank is buried, a screw cap 48 being provided to close the casing.

When the float falls, the valve 39 falls by gravity and opens the passage for gasolene which runs into the tank until the rise of the float once more seats the valve and shuts off the gasolene, which after entering the well in the filler piece 11 passes thereunder through suitable grooves and the grooves 16 and 17 in the respective blocks 10 and 13 to all parts of the tank.

The tank may be reduced in length for economy of space while retaining the superficial area and length of channels 24 by bending the channels backward and forward as shown in Fig. 8.

Instead of forming the carbureting passage or passages 19 of three or more plates, two only may be employed as represented in Fig. 9. The top plate 29 is shown in this figure divided into two parts, the inner end of each part being soldered or otherwise tightly fastened to the spraying head 18.

Another form of the invention is shown in Fig. 10. In this case but one filler block 10 is used, the spraying head 18 being placed near one end of the tank A and the top plate 29 of the carbureting passage 19 soldered thereto as in Fig. 9. A plate 50 is attached to the opposite side of the spraying head and projects downwardly nearly to the bottom of the tank as shown. The plate 29 may, however, extend over the spraying head and downwardly, thus doing away with the plate 50. A float and gas admission mechanism will preferably be employed with this form of the invention, although not shown in the drawing.

Instead of using a plurality of plates to form wide shallow channels in the carbureting passage, a large number of small tubes 51 can be used as shown in Fig. 11, or larger concentrically disposed tubes 52 may surround the small tubes 51, as in Fig. 12, or rods 53 may be inserted in the tubes 52 in place of the small tubes 51.

What I claim is:—

1. In a carbureting apparatus, a tank, a carbureting passage having a long and broad but shallow channel therethrough, and a spraying head through which air is forced in minute streams into a fluid hydrocarbon in said tank and directly into one end of said carbureting passage, in combination with means for maintaining a constant supply of hydrocarbon fluid at the inlet end of said channel.

2. In a carbureting apparatus, a tank, a carbureting passage having a plurality of long and broad but shallow parallel channels therethrough, and a spraying head through which air is forced in minute streams into a fluid hydrocarbon in said tank and directly into one end of said carbureting passage, in combination with means for maintaining a constant supply of hydrocarbon fluid at the inlet ends of said channel.

3. In a carbureting apparatus, a tank, a carbureting passage containing a plurality of shallow channels, means through which air is forced in minute streams into a fluid hydrocarbon partly filling said tank and into one end of said carbureting passage whereby the walls of said channels are kept coated with the hydrocarbon to enrich the air flowing through said channels, and means for maintaining a constant level of hydrocarbon fluid in the tank.

4. In a carbureting apparatus, a tank, filler blocks therein spaced apart, a grooved block in said space, a spraying head on said latter block having minute holes through which air is forced into hydrocarbon fluid in said tank, and a carbureting passage formed with shallow channels open in line with said minute holes supported on said filler block through which passage the carbureted air passes into a gas chamber comprising the upper part of said tank.

5. In a carbureting apparatus, a tank, a pair of filler blocks therein spaced apart and grooved on their bottoms, sides and outer ends, a grooved block in said space, a spraying head having minute holes through which air is forced into a hydrocarbon fluid in said tank, and carbureting passages formed with channels open in line with said minute holes and supported on said filler blocks, said carbureting passages comprising parallel plates slightly separated to form flues for the carbureted air.

6. In a carbureting apparatus, a tank, a pair of filler blocks therein spaced apart and nearly filling said tank and having their upper surfaces inclined toward each other, a grooved block in the space between said filler block, a spraying head having minute holes through which air is forced into hydrocarbon fluid in said tank, and carbureting passages formed with channels supported on the inclined surfaces of said filler blocks, said passages comprising parallel plates slightly separated to form flues for the carbureted air, the uppermost of said plates extending to the upper part of said spraying head.

7. In a carbureting apparatus, a tank, a pair of spaced filler blocks having grooved sides and bottoms within said tank and closely adjacent its sides and bottom, a grooved block in the space between the filler blocks, said grooves permitting a hydrocarbon fluid to circulate in said tank, a spraying head having minute holes through which air is forced into the hydrocarbon fluid, a carbureting passage formed with long and broad but shallow channels for the passage of carbureted air and supported on said filler blocks, a valved hydrocarbon fluid inlet, and means for maintaining a constant fluid level in the tank.

8. In a carbureting apparatus, a tank, a pair of spaced filler blocks having grooved sides and bottoms within and substantially in contact with the sides and bottom of said tank, a block having side and bottom grooves within the space between said filler blocks, a carbureting passage supported on the filler block and formed with long and broad but shallow channels for the flow therethrough of carbureted air, a spraying head between the filler blocks and having a plurality of minute holes on each side opposite to the inner openings of said channels through which holes air is forced, a hydrocarbon inlet valve, and a float operating said valve for maintaining a constant fluid level in the tank.

In testimony whereof I have hereunto set my hand in presence of two subscribing witnesses.

CLARENCE M. KEMP.

Witnesses:
M. YOUNG,
CHARLES CROOK.

---

Copies of this patent may be obtained for five cents each, by addressing the "Commissioner of Patents, Washington, D. C."